United States Patent

Ogino et al.

[11] Patent Number: 5,815,751
[45] Date of Patent: Sep. 29, 1998

[54] CAMERA LOADABLE WITH FILM CARTRIDGE HAVING FILM PHOTOGRAPHING INFORMATION

[75] Inventors: Akira Ogino, Osaka; Ryuichi Yasuhara, Sakai, both of Japan

[73] Assignee: Minolta Co., Ltd., Osaka, Japan

[21] Appl. No.: 803,470

[22] Filed: Feb. 20, 1997

[30] Foreign Application Priority Data

Feb. 21, 1996 [JP] Japan .................................. 8-034097

[51] Int. Cl.⁶ .................................................. G03B 17/26
[52] U.S. Cl. ........................................ 396/207; 396/515
[58] Field of Search ..................................... 396/207, 515

[56] References Cited

U.S. PATENT DOCUMENTS

| | | | |
|---|---|---|---|
| 5,278,600 | 1/1994 | Takahashi et al. | 354/275 |
| 5,321,455 | 6/1994 | Cocca | 354/207 |
| 5,347,334 | 9/1994 | Smart et al. | 354/275 |
| 5,541,681 | 7/1996 | Cocca et al. | 396/207 X |

*Primary Examiner*—W. B. Perkey
*Attorney, Agent, or Firm*—McDermott, Will & Emery

[57] ABSTRACT

A camera is loadable with a film cartridge having a rotary spool connected with a film and a bar code disk rotatable with the rotary spool and provided with a bar code for indicating photographing information of the film. While the rotary spool is being rotated, the bar code on the bar code disk is read by two readers to judge whether the film has been exposed. Code data is generated based on a read signal produced by the readers after the bar code disk rotates together with the rotary spool a predetermined rotation amount after the film is judged to have not been exposed, and is decoded into film information.

10 Claims, 15 Drawing Sheets

CAMERA LOADABLE WITH FILM CARTRIDGE HAVING FILM PHOTOGRAPHING INFORMATION

BACKGROUND OF THE INVENTION

This invention relates to a camera loadable with a film cartridge having film photographing information, particularly to reading of film photographing information represented by a bar code disk integrally rotatably mounted on a spool of the film cartridge.

In recent years, films in accordance with the novel photographic system have been standardized, and the commercialization of cameras using such films has been promoted.

The film in accordance with the novel photographic system is such as disclosed in, e.g. U.S. Pat. No. 5,347,334 that a light blocking lid is provided at a film outlet of a cartridge so that the film can completely be contained in the film cartridge. Accordingly, the cartridge acts not only as a container for an unexposed film, but also as a container for a developed film.

Further, at one end of a spool, a bar code disk on one surface of which a bar code representing pieces of information photographing information concerning the film (number of exposures, ISO sensitivity, etc.: hereinafter, referred collectively to as "film photographing information") are recorded in a circumferential direction is integrally rotatably provided. The film photographing information is read by decoding stripes of the bar code, and the state of the film (unexposed film, exposed film, partly exposed film or developed film) can be judged based on a detection signal of the bar code.

Specifically, in accordance with the specification of a bar code recording method, the film photographing information is read by moving an optical sensor such as a photoreflector in the circumferential direction with respect to the bar code disk, detecting the bar code after converting it into a pulse train signal, and decoding an on-off pattern of the pulse train signal. The state of the film is judged by checking the number of changes (rise and fall of level) of the pulse train signal during a predetermined period. This check is made for the following reason. In the film in accordance with the novel photographic system, the stop position of the bar code disk with respect to a reference position of the cartridge is predetermined depending upon the state of the film. When the bar code is detected after the start of the rotation of the bar code disk, the phase of the pulse train signal differs depending upon the state of the film, and the level of the pulse train signal changes by a specified number of times depending upon the state of the film during the predetermined period after the start of the detection.

Accordingly, a camera using the above film is provided with a reading device for reading the film photographing information recorded on the bar code disk. When the cartridge is loaded in a cartridge chamber of the camera, the bar code on the bar code disk is read.

Specifically, in the cartridge chamber, an optical sensor for detecting the bar code is provided, and a fork fittable into the spool of the cartridge when the cartridge is loaded is rotatably provided. By rotating this fork, the spool (i.e. the bar code disk) of the cartridge is rotated in a direction to pull the film out or a direction opposite thereto to move the optical sensor in the circumferential direction with respect to the bar code disk, thereby detecting a pulse train signal corresponding to the bar code. An initial position of the bar code disk, i.e. the state of the film is judged based on the number of level changes in the pulse train signal, and the film photographing information is read based on the on-off pattern of the pulse train signal.

In the film cartridge constructed as above, the film photographing information is read based on the pattern of the detection signal of the bar code and the initial position of the bar code disk (i.e. the state of the film) is judged based on the number of level changes in the detection signal of the bar code during the predetermined period after the start of the rotation of the bar code disk. Accordingly, in the case that the rotation start timing of the bar code disk is delayed from the judgment start timing and a noise is generated during this delay, there may be an error in decoding the film photographing information and in judging the state of the film. Specifically, in the case that the detection of the bar code by the optical sensor is performed simultaneously with the start of the rotation of the fork, if the rotation of the spool is started later than the start of the rotation of the fork and a noise is generated during this delay, this noise changes the pattern of the pulse train signal and varies the number of level changes in the detection signal of the bar code during the predetermined period. This causes an error in decoding the film photographing information and in judging the state of the film.

A delay in the rotation start timing of the spool and the rotation start timing of the fork is caused by a delay between the start of rotation of the fork and its fitting into the spool. The optical sensor is subject to the above noise due to the fork sliding along an engaging surface of the spool and/or fitted into the spool during this delay.

Normally, a key groove is formed in the inner surface of a fitting hole of the spool into which the fork is fitted, and a key engageable with the key groove projects from the fork. Since the position of the key of the fork and the position of the key groove of the spool do not necessary always coincide with each other when the cartridge is loaded into the cartridge chamber, the above timings may be delayed.

Specifically, when the cartridge is ejected from the film chamber, the bar code disk needs to be set in a specified position corresponding to the state of the film. Accordingly, the key of the fork is in a position corresponding to the state of the ejected cartridge. On the other hand, the key groove of the spool of the film cartridge is in a position corresponding to the state of the film. Accordingly, if, for example, the cartridge ejected last time contains an exposed film and the cartridge to be loaded this time contains a partly exposed film, the position of the key of the fork differs from the position of the key groove of the spool.

Thus, when the fork is rotated, the bar code disk starts rotating at a timing when the key of the fork is engaged with the key groove of the spool. The fork slides on the engaging surface of the spool until the key is engaged with the key groove. During this time, the bar code disk does not rotate. Resulting from the sliding of the fork and the fitting of the fork into the spool, a noise is generated in the detection signal of the optical sensor.

Timings at which the key of the fork is engaged with the key groove of the spool and the bar code disk starts rotating may be detected and the judgment of the detection signal of the optical sensor may be started at this timing. However, since a device for detecting the engaging timing of the key and the key groove is complicated, such a detection is not practical.

SUMMARY OF THE INVENTION

It is an object of the present invention to provide a camera loadable with a film cartridge having film photographing information which has overcome the problems residing in the prior art.

It is another object of the present invention to provide a camera loadable with a film cartridge having film photographing information which can accurately and securely read film photographing information provided on a film cartridge.

It is another object of the present invention to provide a loading method which can accurately load a camera with a film cartridge having film photographing information.

According to an aspect of the present invention, a camera loadable with a film cartridge having a rotary spool connected with a film and a bar code disk rotatable with the rotary spool and provided with a bar code for indicating photographing information of the film, the camera comprises: a fork engageable with the rotary spool when the film cartridge is loaded; a motor which rotates the fork to rotate the rotary spool; a reader which reads the bar code on the bar code disk to produce a read signal; a code data generator which generates code data based on a read signal; a decoder which decodes generated code data into photographing information of the film; and a controller which controls the code data generator to generate code data based on a read signal produced by the reader after the bar code disk rotates together with the rotary spool a predetermined rotation amount.

The predetermined rotation amount may preferably be one turn.

The photographing information may include the number of frames of the loaded film and the ISO sensitivity of the loaded film.

The code data generator may be preferably provided with: a pulse generator which generates a pulse train signal in accordance with rotation of the motor; a converter which converts a read signal into bar code data in reference to the pulse train signal.

According to another aspect of the present invention, a camera loadable with a film cartridge having a rotary spool connected with a film and a bar code disk rotatable with the rotary spool and provided with a bar code for indicating an exposure state of the film, the camera comprises: a fork engageable with the rotary spool when the film cartridge is loaded; a motor which rotates the fork to rotate the rotary spool; a first reader which reads the bar code on the bar code disk to produce a first read signal; a second reader which reads the bar code on the bar code disk to produce a second read signal, the second reader being provided at such a different position from the first reader that the first read signal has a first predetermined number of changes or more before the second read signal has an initial change when a loaded film is in an unexposed state, and the first read signal has a second predetermined number of changes or less before the second read signal has an initial change when a loaded film is in a state other than an unexposed state; a counter which counts changes in the first read signal before the second read signal has an initial change; a comparator which compares a counted change number with a predetermined reference value. The predetermined reference value being greater than an intermediate value between the first and second predetermined numbers; and a judger which judges an exposure state of the film based on a result of the comparator.

It may be appreciated that the first predetermined number is ten, the second predetermined number is two, and the predetermined reference value is nine.

According to still another object of the present invention, a method for loading a camera with a film cartridge having a rotary spool connected with a film and a bar code disk rotatable with the rotary spool and provided with a bar code for indicating film information, the method comprises steps of: engaging the rotary spool of the film cartridge with a fork provided on the camera; rotating the fork to rotate the rotary spool; and reading the bar code on the bar code disk by first and second readers to judge based on read signals of the first and second readers whether the film has been exposed.

It may be preferable that the first and second readers are provided at such different positions that the first read signal has a first predetermined number of changes or more before the second read signal has an initial change when a loaded film is in an unexposed state, and the first read signal has a second predetermined number of changes or less before the second read signal has an initial change when a loaded film is in a state other than an unexposed state. In this case, the judgment as to whether the film has been exposed may be made by: counting changes in the first read signal before the second read signal has an initial change; and comparing a counted change number with a predetermined reference value, the predetermined reference value being greater than an intermediate between the first and second predetermined numbers.

Further, there may be provided steps of: detecting whether the bar code disk rotates together with the rotary spool a predetermined rotation amount after the film is judged to have not been exposed; generating code data based on a read signal produced by one or both of the first and second readers after the bar code disk is detected to rotate the predetermined rotation amount; and decoding generated code data into film information. The predetermined rotation amount may be one turn.

These and other objects, features and advantages of the present invention will become more apparent upon a reading of the following detailed description and accompanying drawings.

DETAILED DESCRIPTION OF THE PREFERRED EMBODIMENT OF THE INVENTION

A preferred embodiment of the present invention will be described with reference to the accompanying drawings.

First, there is briefly described a film cartridge in accordance with the novel photographic system to be loaded onto a camera provided with a film information reading device.

Figure 1:
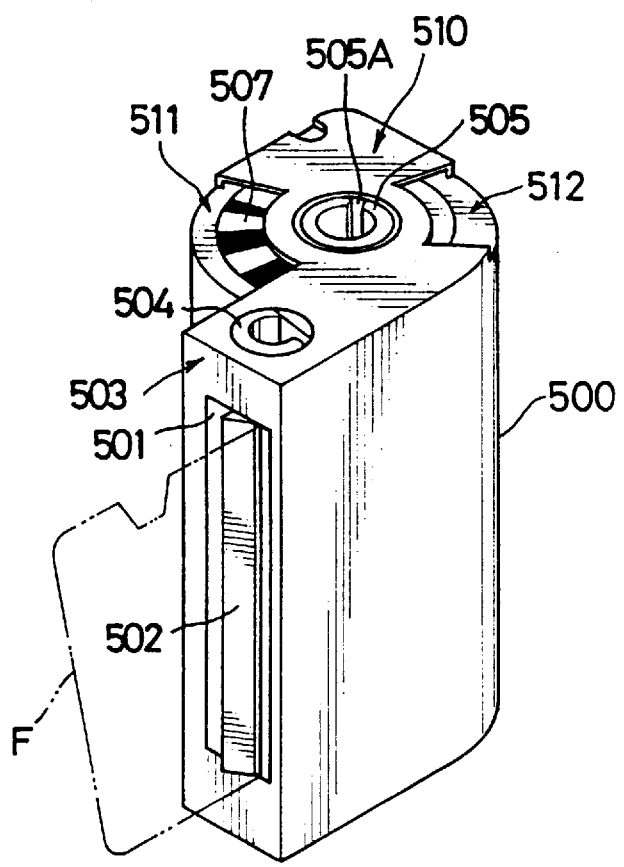
FIG. 1 is a perspective view of a film cartridge in accordance with a novel photographic system when viewed from above.
Figure 2:
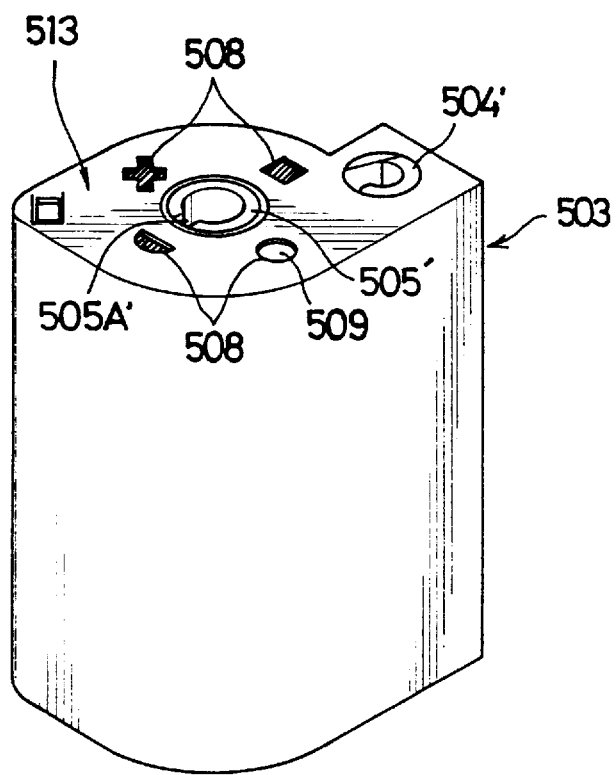
FIG. 2 is a perspective view of the film cartridge when viewed from below.
Figure 3:
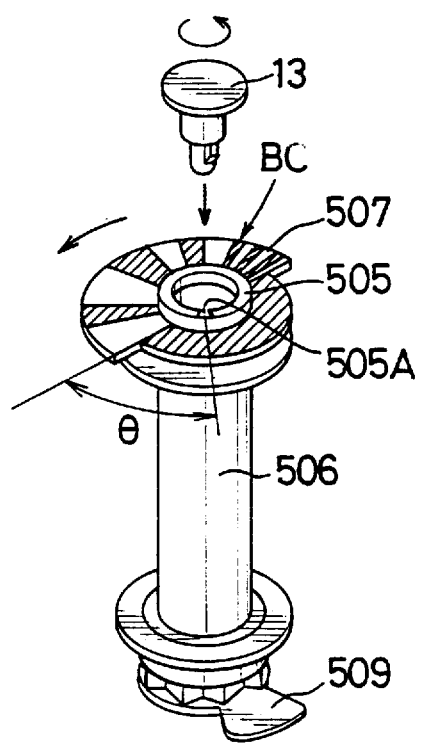
FIG. 3 is a perspective view of a bar code disk provided on a spool.

Referring to FIGS. 1 to 3, a cartridge film in accordance with the novel photographic system includes a cartridge 500 provided with a light blocking lid 502 at a film outlet 501 so that a film F can completely be contained in the cartridge 500. Accordingly, the camera using such a cartridge film is provided with a so-called film loading mechanism of pulling the film F out of the cartridge 500 and winding it around a take-up spool when the cartridge film is set, and feeding the film F until the first frame reaches an image recording position where an exposure can be made to a set frame.

The cartridge 500 has a tubular shape and is provided with a film pull-out portion 503 on its surface parallel to its axis. The film outlet 501 is provided on a side surface at the leading end of the film pull-out portion 503.

The light blocking lid 502 is a rotatable lid, and is opened and closed by inserting a key of specified shape into a key hole 504 opening in an upper surface 510 and a lower surface 513 of the cartridge 500 and provided at the leading end of the film pull-out portion 503 and by rotating this key. As described later, an opening key for opening and closing the light blocking lid 502 is provided in a cartridge chamber of the camera. When the cartridge 500 is accommodated in the cartridge chamber, this opening key is fittable into the key hole 504.

In the axial center of the cartridge 500, a spool 506 for winding and rewinding the film F is rotatably provided. At the opposite ends of the spool 506, there are formed spool holes 505, 505' into which forks 13, 15 (see, FIG. 3, FIG. 8) provided at the cartridge chamber and the cartridge lid are fittable. Key grooves 505A, 505A' into which the keys of the forks 13, 15 are fittable are formed in the inner surfaces of the spool holes 505, 505'.

At the end of the spool 506 facing the upper surface 510 of the cartridge 500, a bar code disk 507 on which an information concerning photographing for the film F contained in the cartridge 500 (number of exposures, ISO sensitivity, color/black-and-white, negative/positive, and like information) is recorded in the form of a bar code BC is integrally rotatably secured. On the other hand, a white indicator 509 is integrally rotatably secured to the other end of the spool 506 facing the lower surface 513 of the cartridge 500 (see FIG. 3).

Notches 511, 512 are formed in substantially opposite positions of a suitable peripheral portion of the upper surface 510 of the cartridge 500. The bar code BC formed on the surface of the bar code disk 507 is readable through the notches 511, 512.

Figure 4:
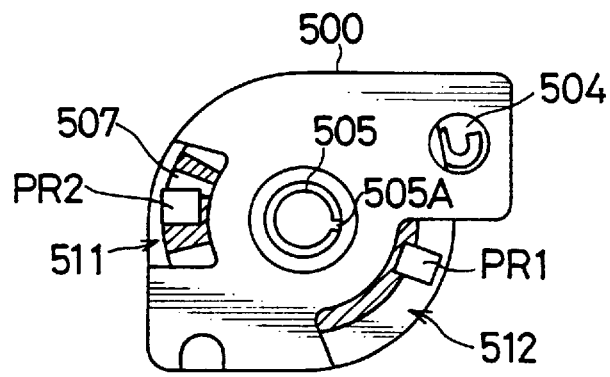
FIG. 4 is a diagram showing positions of two optical sensors for detecting a bar code on the bar code disk.

More specifically, in the cartridge chamber of the camera, photoreflectors PR1, PR2 are provided in positions to be opposed to the notches 511, 512. When the cartridge 500 is accommodated in the cartridge chamber, the photoreflectors PR1, PR2 face the peripheral positions of the bar code disk 507 through the notches 511, 512 as shown in FIG. 4. The spool 506 and the bar code disk 507 are integrally rotated via the fork 13 to relatively move the photoreflectors PR1, PR2 in a circumferential direction of the bar code disk 507 by rotating the bar code disk 507. As a result, signals corresponding to the stripe pattern of the bar code BC are detected. The detection of the bar code BC is described later.

On the other hand, four marks 508 representing the information concerning the state of the film F (unexposed film, exposed film, partly exposed film, developed film) are embossed in the lower surface 513 of the cartridge 500 around the spool hole 505'. The marks 508 allows a camera operator to visually confirm the state of the film F contained in the cartridge 500. When the indicator 509 is positioned in the position of any of the marks 508, the color of this mark 508 turns white, allowing the confirmation of the state of the film F.

It should be noted that "○", "×", "□" and "D" denote an unexposed film, an exposed film, a developed film and a partly exposed film, respectively. Since the bar code disk 507 and the indicator 509 are rotated together with the spool 506 as described above, the indicator 509 is positioned to a desired mark 508 by controlling the stop position of the spool 506 such that the key grooves 505A, 505A' of the spool 506 are oriented in specified directions with respect to the cartridge 500 when the cartridge 500 is to be ejected from the cartridge chamber. Further, an initial position of the spool 506 is detected based on the detection signal of the bar code BC, and the state of the film F is judged based on this detection result.

Figure 5:
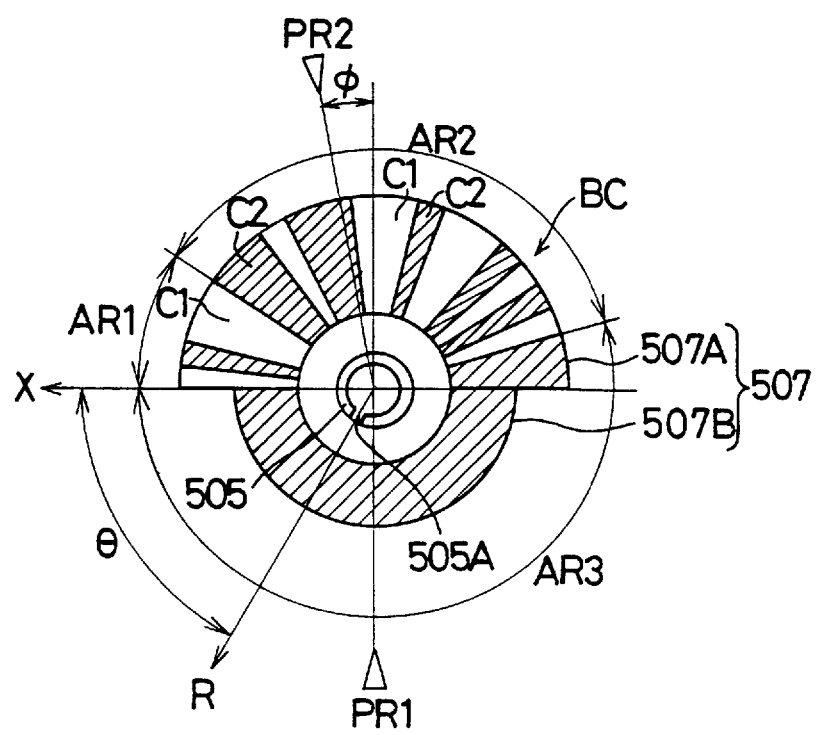
FIG. 5 is a diagram showing an exemplary bar code formed on the surface of the bar code disk.

FIG. 5 is a diagram showing an exemplary bar code formed on the surface of the bar code disk 507.

The bar code disk 507 is obtained by joining two semicircular members 507A, 507B having different diameters such that their axes coincide with each other, and the bar code BC is formed on one surface of the semicircular member 507A. If a reference axis X is assumed to be a straight line extending from the center of the bar code disk 507 and along a linear contour of the semicircular member 507A forming a Step #with the semicircular member 507B on the left side when the semicircular member 507A is located above the semicircular member 507B, the bar code disk 507 is secured to the spool 506 such that a direction R of the key groove 505A of the spool 506 is displaced counterclockwise from the reference axis X by a specified angle θ.

The bar code BC is formed by alternately arranging in total of 13 fan-shaped white zones C1 (hereinafter, "spaces C1") and black zones C2 (hereinafter, "bars C2") each having a specified open angle in a clockwise direction from the reference axis X. The respective zones correspond to the respective bits of a 13-bit signal. A judgment as to whether the bit represents "1" or "0" is made based on the open angle of the space C1 or the bar C2.

Specifically, the spaces C1 and bars C2 have two kinds of opening angles (hereinafter, wide-angled spaces C1 and bars C2 are referred to as wide spaces C1 and wide bars C2, whereas narrow-angled spaces C1 and bars C2 are referred to as narrow spaces C1 and narrow bars C2). If, for example, "1" denotes a wide space or bar and "0" denotes a narrow space or bar, the wide spaces C1 and the wide bars C2 represent "1" and the narrow spaces C1 and the narrow bars C2 represent "0".

Since the signal detected by scanning the bar code BC is an on-off signal corresponding to the alternately arranged spaces C1 and bars C2, whether or not each bit represents "1" or "0" is judged by judging the duration of an on-period and the duration of an off-period. In this way, the information on the bar code BC represented by the 13-bit signal is read.

An area defined between the reference axis X and the second space C1 (area AR1 in FIG. 5), i.e. an area corresponding to three bits obtained by scanning the two spaces C1 and one bar C2 is a code area representing the number of exposures of the film F. An area defined between the second bar C2 following the area AR1 and the 13th space C1 (area AR2 in FIG. 5), i.e. an area corresponding to ten bits obtained by scanning five spaces C1 and five bars C2 is a code area representing the ISO sensitivity, color/black-and-white, negative/position, etc.).

An area not including the areas AR1, AR2 (area AR3 in FIG. 5) is used to detect the leading end position of the bar code BC and is constructed by black zones.

Figure 6:
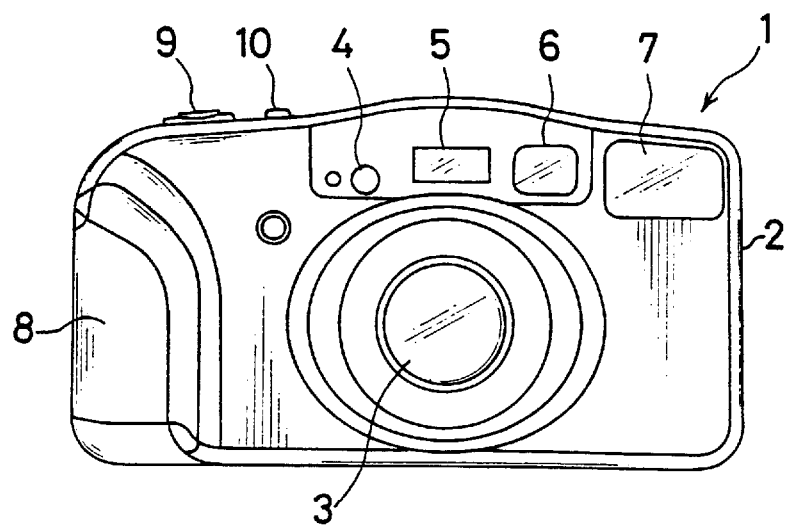
FIG. 6 is a front view showing an external configuration of a camera provided with a film photographing information reading device.
Figure 7:
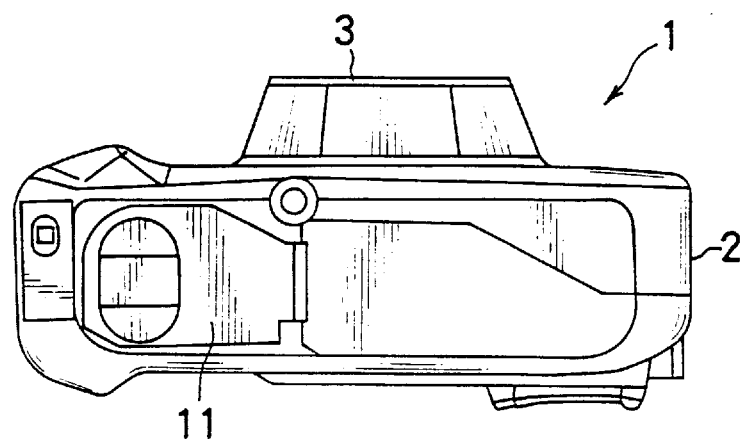
FIG. 7 is a bottom view showing an external configuration of the camera provided with the film photographing information reading device.

FIG. 6 is a front view showing the external configuration of a camera provided with the film photographing information reading device according to the invention, and FIG. 7 is a bottom view showing the external configuration of the camera.

A camera 1 is provided with a taking lens 3 substantially in the middle of the front surface of a camera main body 2, and a light meter 4, an AF distance meter 5 and a viewfinder widow 6 are arranged above the taking lens 3. A built-in flash 7 is provided in an upper right end portion of the front surface of the camera main body 2. A grip 8 is provided at a left end portion of the front surface of the camera main body 2. A shutter release button 9 and a main switch 10 are provided above the grip 8.

A cartridge chamber 12 having a cartridge loading port at its lower surface is provided at a left end portion inside the camera main body 2. The cartridge 500 is accommodated into the cartridge chamber 12 by opening a cartridge lid 11 openably provided at the cartridge loading port (see FIG. 7).

Figure 8:
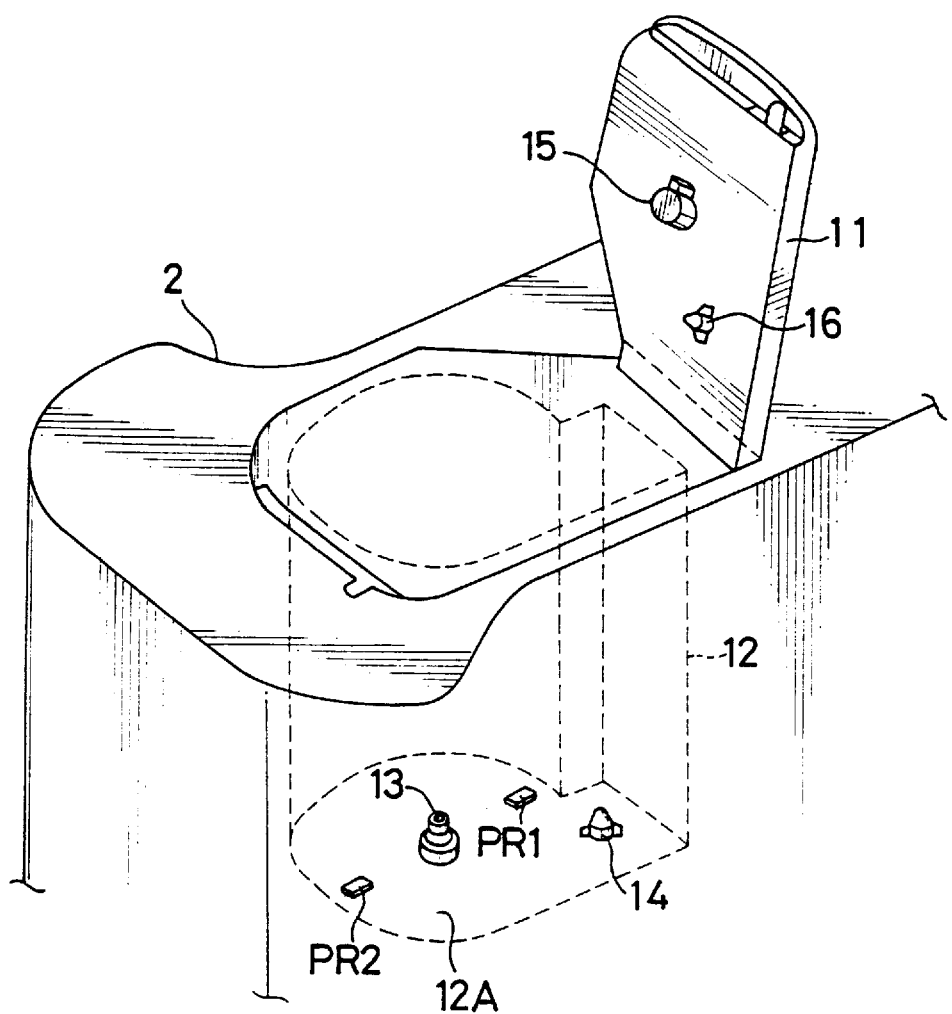
FIG. 8 is a perspective view of an essential portion of a cartridge chamber in which the film cartridge is to be loaded.

FIG. 8 is a perspective view of an essential portion of the cartridge chamber 12 into which the cartridge 500 is loaded. In FIG. 8, the camera main body 2 is drawn upside down.

The cartridge chamber 12 has a cylindrical inner shape which is substantially the same as the outer shape of the cartridge 500, and is constructed by an unillustrated housing. At a bottom surface 12A of the cartridge chamber 12, the fork 13 is rotatably and projectingly provided in a position to be opposed to the spool hole 505 of the loaded cartridge 500, and the light blocking lid opening key 14 is rotatably and projectingly provided in a position to be opposed to the key hole 504 of the cartridge 500. Further, the photoreflectors PR1, PR2 are provided in positions of the bottom surface 12A to be opposed to the notches 511, 512 of the cartridge 500.

On the other hand, on the surface of the cartridge lid 11 facing the cartridge loading port, a fork 15 is rotatably and projectingly provided in a position to be opposed to the spool hole 505' of the cartridge 500 to be loaded into the cartridge chamber 12, and a light blocking lid opening key 16 is rotatably and projectingly provided in a position to be opposed to the key hole 504' of the cartridge 500.

Figure 9:
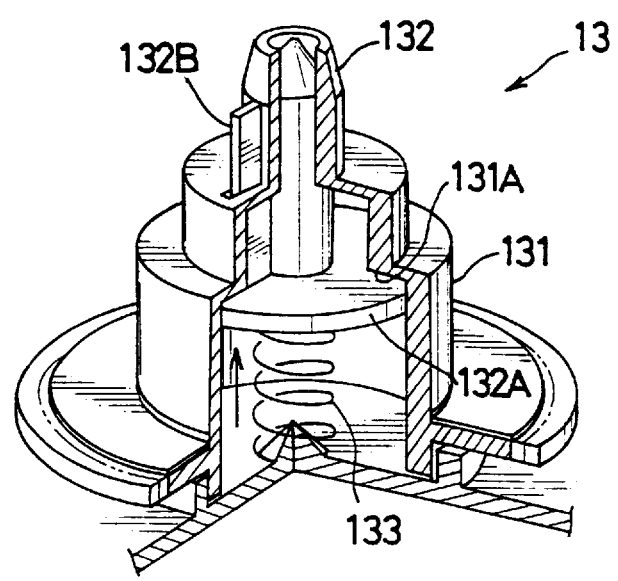
FIG. 9 is a perspective view partly in section showing a construction of a fork.

As shown in FIG. 9, the fork 13 includes a cylindrical base 131 having a stepped portion 131A in an intermediate position with respect to its height direction, a cylindrical projection 132 loosely fitted into the base 131, and a coil spring 133. The projection 132 has a jaw portion 132A at its base end and a plate-shaped key 132B on its side outer surface. The projection 132 is biased upward by the coil spring 133 mounted between the jaw portion 132A and the bottom surface of the base 131, and is held movably upward and downward such that its leading end projects out of the upper surface of the base 131 when the jaw portion 132A is in contact with the stepped portion 131A of the base 131. The fork 15 is constructed substantially in the same manner as the fork 13.

Further, the fork 13 is connected with an unillustrated torque transmission mechanism provided outside the bottom surface 12A of the cartridge chamber 12. The fork 13 is driven to rotate by a torque of an unillustrated motor transmitted via this torque transmission mechanism.

Figure 10:
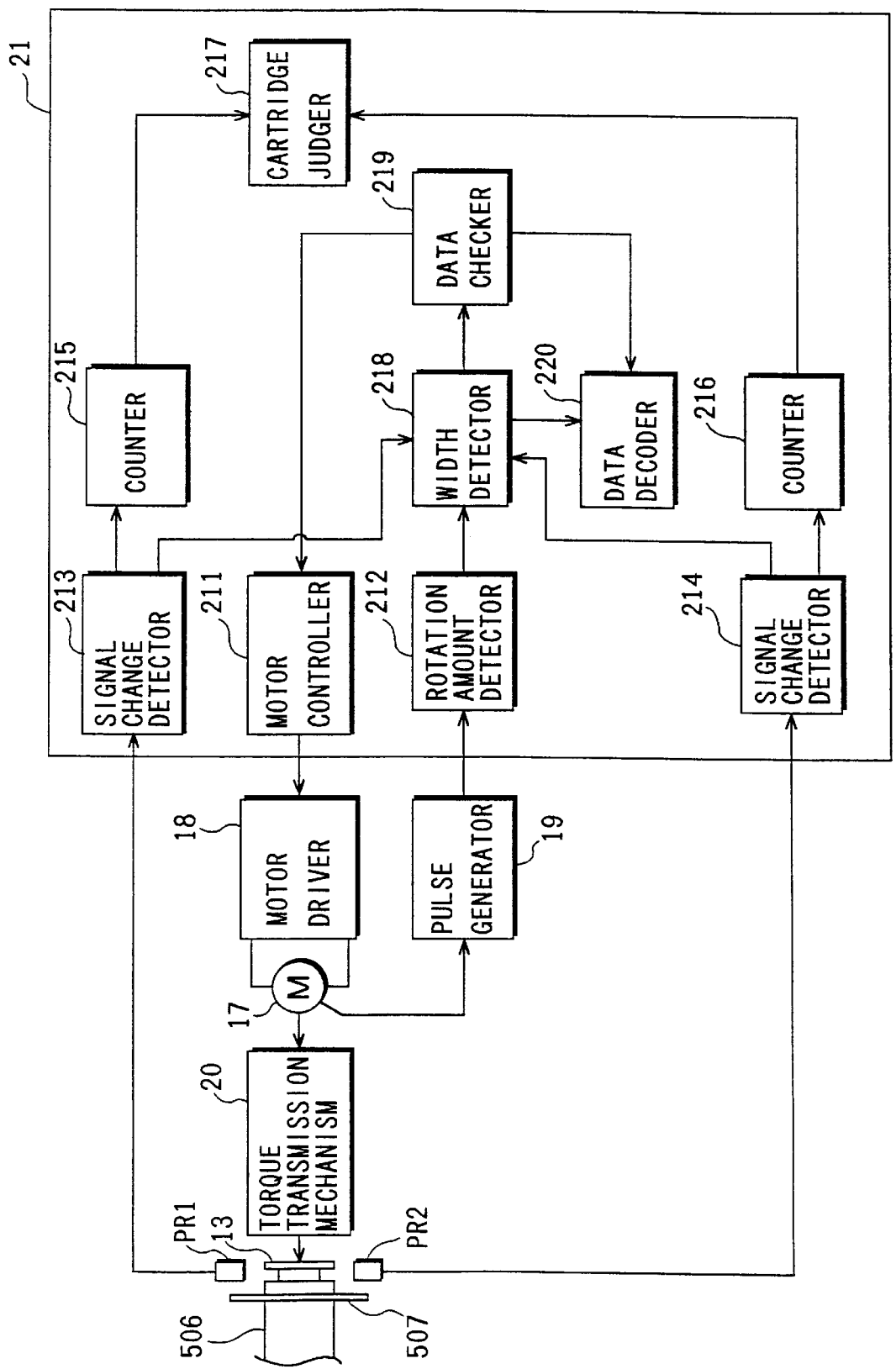
FIG. 10 is a block diagram of a control system of the film photographing information reading device.

FIG. 10 is a block diagram of a control system of the film photographing information reading device according to the invention.

In FIG. 10, the same parts as those mentioned above are identified by the same reference numerals. A motor 17 is a drive source for feeding the film F contained in the cartridge 500 and is, for example, an electric motor such as a stepping motor. A torque of the motor 17 is transmitted to the spool 506 via a torque transmission mechanism 20 to pull the film F out of the cartridge 500 during the film loading, to rewind the film F for the cartridge eject, and to read the bar code BC on the bar code disk 507.

A motor driver 18 controls the rotating speed, rotation amount and activation/deactivation of the motor 17 by generating a control signal (e.g. a control signal constructed by a pulse train signal) and sending it to the motor 17.

A pulse generator 19 includes a pulse disk integrally rotatably secured to a drive shaft of the motor 17 and a photoreflector for detecting a pulse code on the pulse disk, and generates a pulse train signal used to detect the rotation amount, rotating speed and the like of the motor 17. The pulse disk is formed at its periphery with stripes and grooves as in a gear arranged at specified intervals in a circumferential direction. The pulse generator 19 generates a pulse train signal of a cycle corresponding to the rotating speed of the pulse disk by detecting the stripes or grooves by the photoreflector.

The torque transmission mechanism 20 includes a speed reducing/torque transmitting portion constructed by a combination of planetary gears, and a drive direction switching portion for switching the connection of a gear train by a cam, and is adapted to switchingly transmit the torque of the motor 17 by switching the position of the cam. The camera is provided with three torque transmission modes: a wind mode, a rewind mode and a thrust mode. In the wind mode, the torque of the motor 17 is transmitted to an unillustrated take-up spool via the torque transmission mechanism 20, and the film F is fed in a film winding direction by the rotation of the take-up spool.

In the rewind mode, the torque of the motor 17 is transmitted to the fork 13 via the torque transmission mechanism 20, and the film F is fed in a film rewinding direction by the rotation of the spool 506 of the cartridge 500. Further, the thrust mode is a drive mode for the film loading. In this mode, the torque of the motor 17 is transmitted to the fork 13 and the take-up spool via the torque transmission mechanism 20. The film F is pulled out of the cartridge 500 by the rotation of the spool 506 of the cartridge 500 and, after being nipped by the take-up spool, the film F is fed in the film winding direction by the rotation of the spool 506 and the take-up spool until an exposure area of the leading frame Fa reaches a specified image recording position.

When the cartridge 500 is accommodated into the cartridge chamber 12, the bar code disk 507 is rotated in a direction opposite to a film pull-out direction to read the bar code BC prior to the film loading as described later. In this case as well, the torque of the motor 17 is transmitted to the fork 13 via the torque transmission mechanism 20, and the bar code disk 507 is rotated by the rotation of the spool 506.

A controller 21 is constructed by a microcomputer for centrally controlling the photographing operation of the camera, and has a function of controlling the information reading from the bar code disk 507. In order to control the information reading, the controller 21 includes a motor controller 211, a rotation amount detector 212, a signal change detectors 213, 214, counters 215, 216, a cartridge judger 217, a width detector 218 for detecting the width of the spaces C1 and the bars C2, a data checker 219, and a data decoder 220.

The motor controller 211 controls the drive and the driving direction of the motor 17. The rotation amount detector 212 detects the rotation amount of the motor 17 based on the pulse train signal input from the pulse generator 19.

The signal change detectors 213, 214 detect a change (rise or fall) in the level of the detection signals of the photoreflectors PR1, PR2, respectively. The counter 215 counts a number $N_A$ of changes in the detection signal of the photoreflector PR1, whereas the counter 216 counts a number $N_B$ of changes in the detection signal of the photoreflector PR2. The cartridge judger 217 judges the kind of the cartridge 500 (i.e. whether the cartridge 500 contains an unexposed film, an exposed film, a partly exposed film or a developed film) based on the numbers $N_A$ and $N_B$.

The width detector 218 detects the width of the spaces C1 and the bars C2 of the bar code BC based on change detection signals of the signal change detectors 213, 214 and the detection signal of the rotation amount detector 212 representing the rotation amount of the motor 17. The data checker 219 checks an abnormality in the data based on the 3-bit data detected from the area AR1 of the bar code BC and the 10-bit data detected from the area AR2 of the bar code BC. In other words, the data checker 219 judges based on a bit pattern whether or not the 3-bit data or 10-bit data is a defined data, and determines that there is an abnormality in the data if the 3-bit data or 10-bit data is an undefined data.

The data decoder 220 decodes pieces of photographing information including the number of exposures and the ISO sensitivity from the 3-bit data and the 10-bit data in the case that these data are defined data.

Next, with reference to a flowchart shown in FIGS. 11 and 12, there is described a control executed in reading the information concerning the exposures made to the film F and the information concerning the state of the film F (hereinafter, "film information") from the bar code BC recorded on the bar code disk 507.

Figure 11:
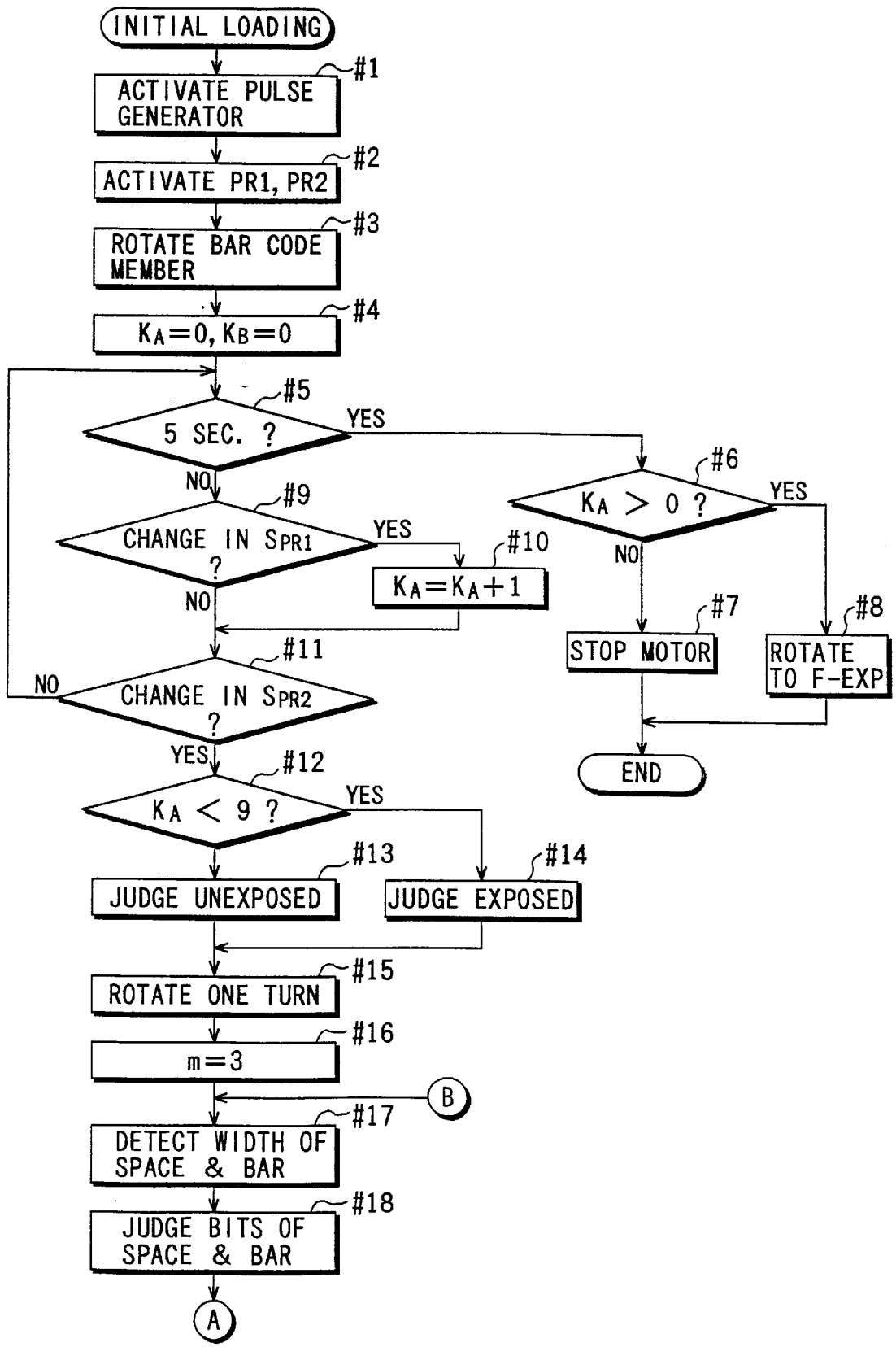
FIGS. 11 and 12 are a flowchart showing a control of a routine "Initial Loading" which is executed to read film photographing information.
Figure 12:
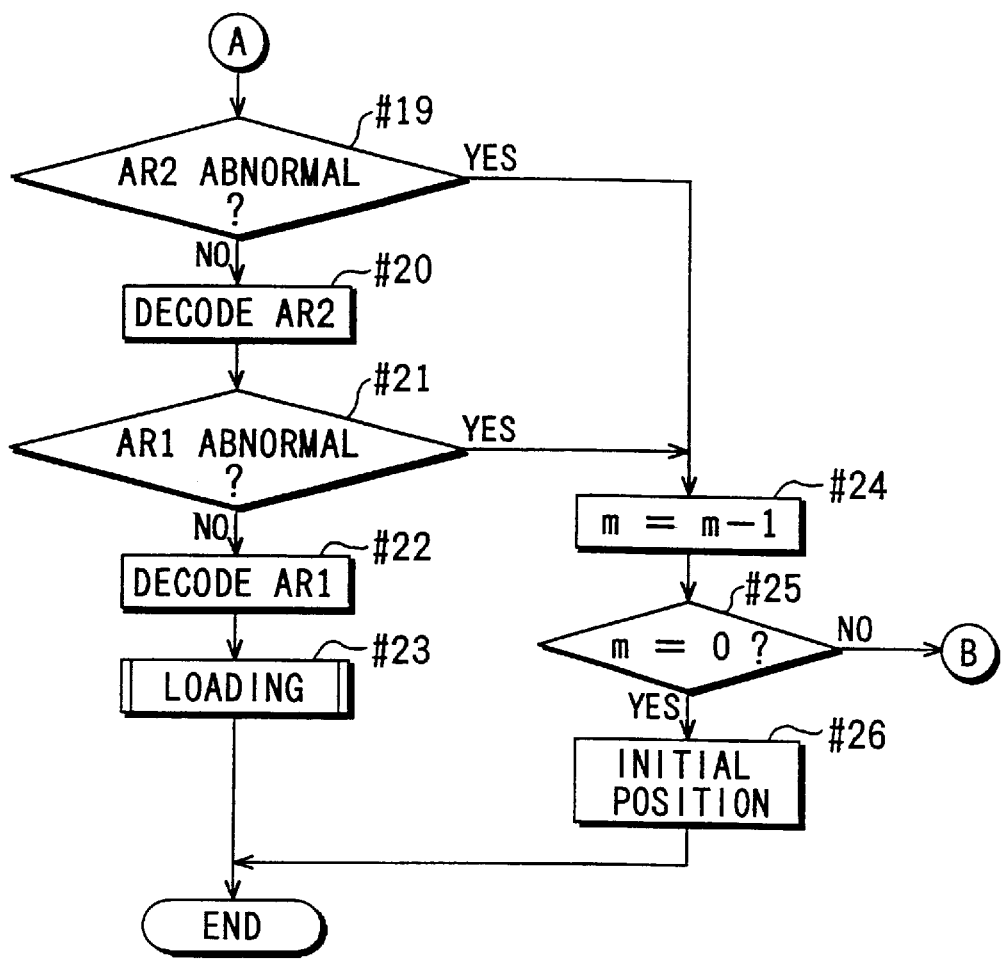

The flowchart of FIGS. 11 and 12 shows only a portion, relating to a control of reading the film information, of a routine "Initial Loading" for pulling the film F out of the cartridge 500 and setting the leading frame in the specified image recording position when the cartridge 500 is loaded.

The control of reading the film information includes a control of detecting the information concerning the state of the film and a control of detecting the information concerning the exposures made to the film. The former detection control is executed in Steps #11 to #14, whereas the latter detection control is executed in Steps #15 to #26.

First, the control of detecting the information concerning the state of the film is described.

When the cartridge 500 is loaded and the cartridge lid 11 is closed, the following operations automatically starts. First, power is applied to the pulse generator 19 and the photoreflectors PR1, PR2 to enable the detection of the rotation amount of the motor 17 and the detection of the bar code BC on the bar code disk 507 (Steps #1, #2). Subsequently, the torque of the motor 17 is transmitted to the fork 13 via the torque transmission mechanism 20, thereby rotating the fork 13 in the direction opposite to the film pull-out direction to start the rotation of the bar code disk 507 (Step #3).

Subsequently, a count value $K_A$ of the counter 215 for counting the number of changes in the level of the detection signal $S_{PR1}$ of the photoreflector PR1 detected by the signal change detector 213 and a count value $K_B$ of the counter 216 for counting the number of changes in the level of the detection signal $S_{PR2}$ of the photoreflector PR2 detected by the signal change detector 214 are both reset to "0" (Step #4). It is then judged whether any level change occurs in the detection signals $S_{PR1}$, $S_{PR2}$ during five seconds (a loop of Steps #5 to #11). If the level changes occurred in the detection signal $S_{PR1}$ before the first level change occurs in the detection signal $S_{PR2}$ (YES in Step #9), the number of level changes $K_A$ is counted (Step #10).

Upon the elapse of five seconds without any level change in the detection signal $S_{PR2}$, a cartridge abnormality is judged and whether or not the cartridge 500 is loaded in the cartridge chamber 12 is judged whether or not the count value $K_A$ is larger than "0" (Step #6). If $K_A=0$ (NO in Step #6), the motor 17 is stopped (Step #7) upon the judgment that the cartridge 500 is not loaded in the cartridge chamber 12, thereby completing the film loading. On the other hand, if $K_A>0$ (YES in Step #6), the bar code disk 507 is rotated to a position "F-EXP (exposed film)" in accordance with the detection signal of the photoreflector PR1 upon the judgment that there is a sensor abnormality although the cartridge 500 is loaded in the cartridge chamber 12 (Step #8), thereby completing the film loading.

The operations of Steps #6 to #8 are performed to judge based on the detection signals of the photoreflectors PR1, PR2 whether the cartridge 500 is loaded and to judge, if the cartridge 500 is loaded, whether the bar code BC on the bar code disk 507 is properly read.

The bar code disk 507 is set in a specified position of the cartridge 500 so as to conform to the state of the film F. When the cartridge 500 is loaded in the cartridge chamber 12, the bar code disk 507 is set to have a specified position with respect to the photoreflectors PR1, PR2 in conformity with the state of the film F.

Figure 13:
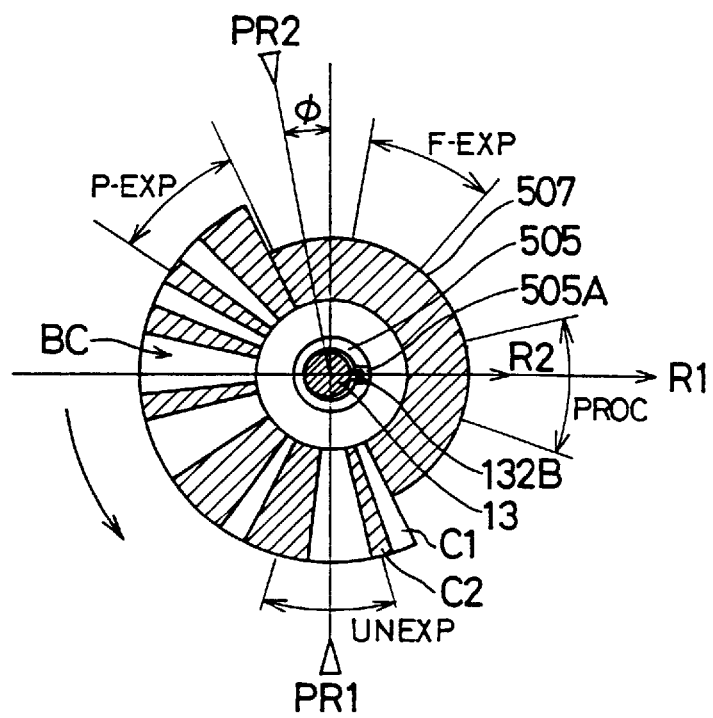
FIG. 13 is a diagram showing a position of the bar code disk with respect to photoreflectors PR1, PR2 when the film cartridge containing an unexposed film is loaded in the cartridge chamber.

FIG. 13 is a diagram showing a position of the bar code disk 507 with respect to the photoreflectors PR1, PR2 when the cartridge 500 containing an unexposed film is loaded in the cartridge chamber 12.

Two marks "Δ" indicate the sensing positions of the photoreflectors PR1, PR2. The photoreflectors PR1, PR2 are arranged in substantially opposite positions (phase angle of (π+∅). The respective areas "UNEXP", "P-EXP", "F-EXP" and "PROC" indicate areas of stop positions for the "unexposed film", "partly exposed film", "exposed film" and "developed film", respectively. For example, in the case of an unexposed film, the initial position of the bar code disk 507 is set so that the area "UNEXP" faces the sensing position of the photoreflector PR1 Likewise, in the case of a partly exposed film, an exposed film or a developed film, the initial position of the bar code disk 507 is set so that the area "P-EXP", "F-EXP" or "PROC" faces the sensing position of the photoreflector PR1. FIG. 13 shows a case where the cartridge 500 containing an unexposed film is loaded into the cartridge chamber 12.

Figure 14:
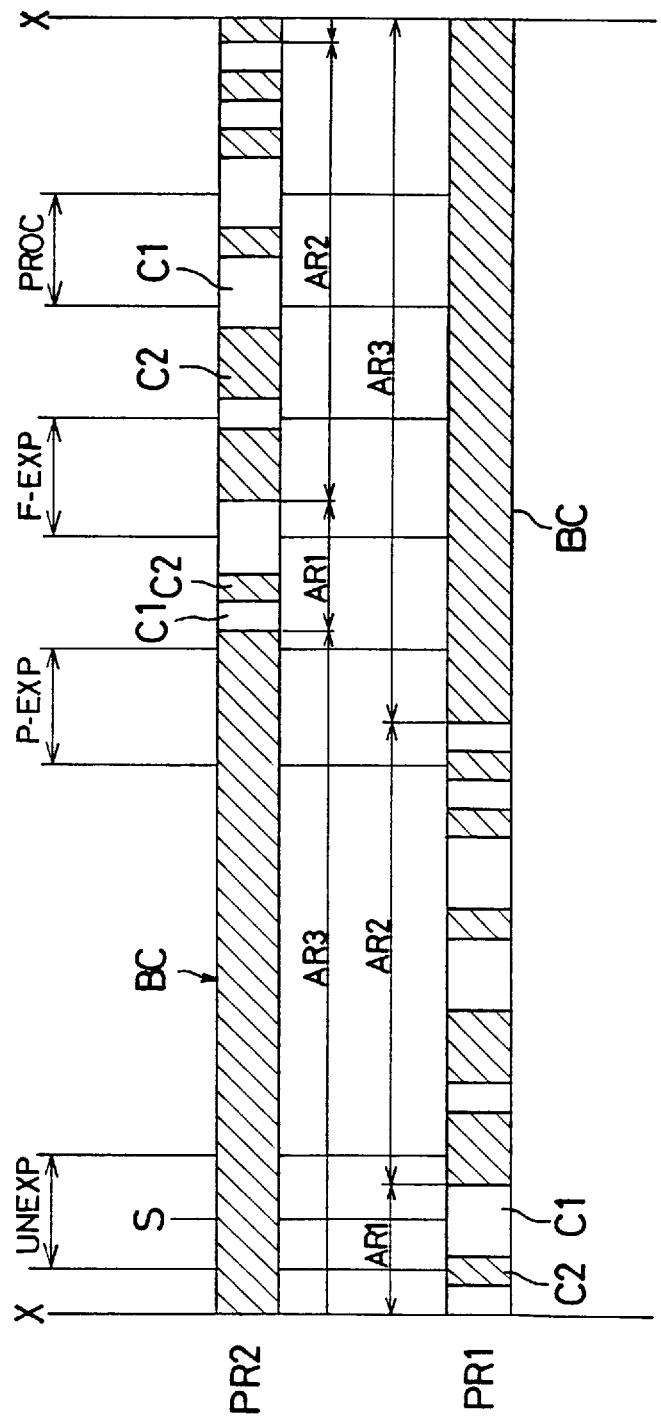
FIG. 14 is a chart showing the stripe patterns of the bar code scanned by the photoreflectors PR1, PR2 when the bar code disk whose initial position is set to "UNEXP" is rotated.

FIG. 14 shows stripe patterns of the bar code BC scanned by the photoreflectors PR1, PR2 in the case that the bar code disk 507 whose initial position is set to "UNEXP" is rotated.

What is shown in FIG. 14 corresponds to the stripe patterns of the bar code BC scanned by the photoreflectors PR1, PR2 in the case that the bar code disk 507 is rotated counterclockwise in the state of FIG. 13. S and X denote the initial positions of the photoreflectors PR1, PR2, and the reference axis X of the bar code disk 507.

Figure 15:
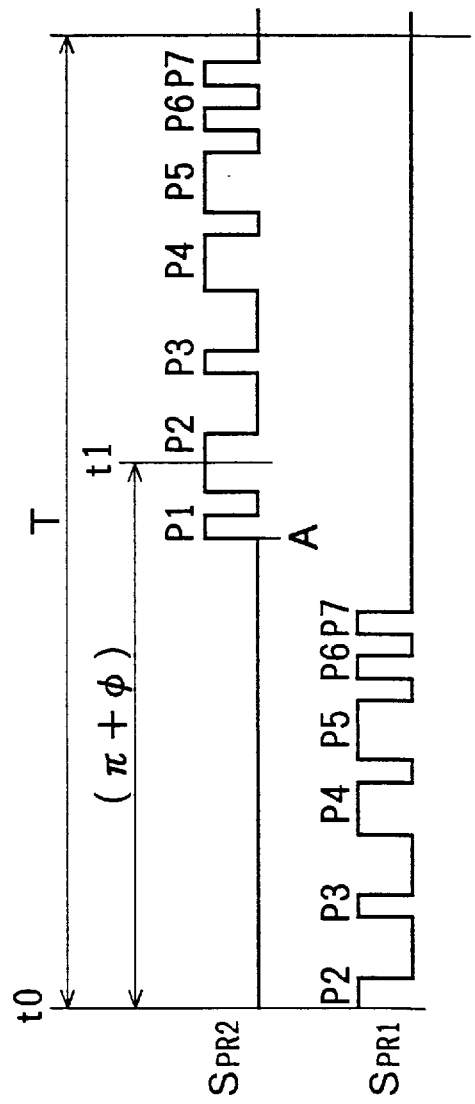
FIG. 15 is a chart showing detection signals $S_{PR1}$, $S_{PR2}$ of the photoreflectors PR1, PR2 when the bar code disk whose initial position is set to "UNEXP" is rotated.

FIG. 15 shows the detection signals $S_{PR1}$, $S_{PR2}$ of the photoreflectors PR1, PR2 when the bar code disk 507 whose initial position is set to "UNEXP" is rotated. In other words, the stripe patterns of the bar code BC shown in FIG. 14 are replaced by the detection signals $S_{PR1}$, $S_{PR2}$ of the photoreflectors PR1, PR2. The black zones and the white zones of the stripe patterns correspond to low level and high level, respectively in the detection signals $S_{PR1}$, $S_{PR2}$ of FIG. 15.

Since the photoreflectors PR1, PR2 are displaced by an angle (π+∅) and the photoreflector PR1 is in a position ahead of the photoreflector PR2 (see FIG. 13), the detection signal $S_{PR1}$ is ahead of the detection signal $S_{PR2}$ in phase by (π+∅).

As is clear from FIG. 14, when the initial positions S of the photoreflectors PR1, PR2 are located in the area "UNEXP", at least 10 level changes are seen in the detection signal $S_{PR1}$ before the first level change is seen in the detection signal $S_{PR2}$. When the initial positions S of the photoreflectors PR1, PR2 are located in the area other than "UNEXP", only two (when the initial positions S are located in the area "P-EXP") or less level changes are seen in the detection signal $S_{PR1}$ before the first level change is seen in the detection signal $S_{PR2}$. Thus, the detection as to whether or not the film is an unexposed film can be made based on the number of level changes.

If the bar code disk 507 properly makes at least one turn, the level change is seen in the detection signals $S_{PR1}$, $S_{PR2}$ without fail. Accordingly, if no level change is seen in the detection signals $S_{PR1}$, $S_{PR2}$ after the elapse of a predetermined time, it can be assumed that the bar code disk 507 is not present, i.e. the cartridge 500 is not loaded in the cartridge chamber 12. The judgment processing in Steps #5, #6, #7 are made to judge whether the cartridge 500 is loaded. In this embodiment, a judgment time for the level change of the detection signals $S_{PR1}$, $S_{PR2}$ is set at five seconds.

Further, in the case that the level change is not seen in the detection signal $S_{PR2}$ despite the fact that the bar code disk 507 has properly made at least one turn, it can be assumed that there is an abnormality in the detector for the bar code BC. The judgment processing in Steps #5, #6, #8 is made to judge whether there is an abnormality in the detector for the bar code BC. If the bar code disk 507 is set to "UNEXP", an erroneous exposure may be made to the film in the cartridge 500. In order to prevent such an undesirable event, the bar code disk 507 is set to "F-EXP" in Step #8.

Referring back to FIG. 11, if the level change has been seen in the detection signal $S_{PR2}$ within five seconds (YES in Step #11), it is then judged whether the count value $K_A$ of the level changes of the detection signal $S_{PR1}$ is smaller than "9" (Step #12). This judgment is made to judge whether the film in the loaded cartridge 500 is an unexposed film based on the fact that the number of level changes of the detection signal $S_{PR1}$ before the first level change is seen in the detection signal $S_{PR2}$ defers depending upon the initial positions S of the photoreflectors PR1, PR2.

As described above, at least 10 level changes are seen in the detection signal $S_{PR1}$ if the initial positions S of the photoreflectors PR1, PR2 are located in the area "UNEXP". Accordingly, if $K_A \geq 9$ (NO in Step #12), the film in the loaded cartridge 500 is judged to be an unexposed film (Step #13). If $K_A < 9$ (YES in Step #12), the film in the loaded cartridge 500 is judged to be an exposed film (or a partly exposed film) (Step #14). Although a judgment threshold value for the count value $K_A$ may be a numerical value smaller than "9", e.g. "6" or "7", a most certain value is set, in this embodiment, as a threshold value in order to further enhance a judgment accuracy.

Subsequently, this routine proceeds to Step #15 to perform the detection control for the information concerning the exposures made to the film F. Specifically, the bar code disk 507 is rotated by one turn based on the number of level changes in the detection signal $S_{PR2}$ (Step #15). As shown in FIG. 15, when the bar code disk 507 makes one turn, seven pulses P1 to P7 are seen in the detection signals $S_{PR1}$, $S_{PR2}$ without fail, i.e. 14 level changes are seen. Accordingly, the bar code disk 507 is rotated until the number $K_B$ of level changes of the detection signal $S_{PR2}$ reaches "15" (including the first level change) after the first level change of the detection signal $S_{PR2}$ is detected at a timing "A".

Subsequently, a count value m of a counter for counting the number of the detection controls for the information concerning the exposures made to the film is set to "3" (Step #16). During the second turn of the bar code disk 507, the durations defined between the successive level changes, i.e. the width of the respective spaces C1 and the respective bars C2 are detected based on a detection signal of the counter 214 representing the level changes in the detection signal $S_{PR2}$ and a detection signal of the rotation amount detector 212 representing the rotation amount of the motor 17 (Step #17).

This width detection is performed to convert into a bit signal by judging the spaces C1 and the bars C2 are narrow or wide. Data used for the width detection are sufficient to enable the relative judgment as to the width of the spaces C1 and the bars C2. The number of pulses output from the pulse generator 19 during each interval between the successive level changes of the detection signal $S_{PR2}$ is detected as a width information of the spaces C1 and the bars C2. The bits of the spaces C1 and the bars C2 are judged based on the detected width information (Step #18).

The reading control for the film information is executed after the bar code disk 507 is rotated by one turn without being scanned for the following reason. The bar code disk 507 does not necessarily start rotating simultaneously with the start of the rotation of the fork 13 (i.e. simultaneously with the start of the signal detection of the photoreflectors PR1, PR2). In the case that the bar code disk 507 starts rotating at a delayed timing, it may result in an erroneous operation caused by the noises of the detection signals $S_{PR1}$, $S_{PR2}$ generated during the delay. The bar code disk 507 is rotated by one turn without being scanned in order to prevent an occurrence of such an erroneous operation.

Figure 16:
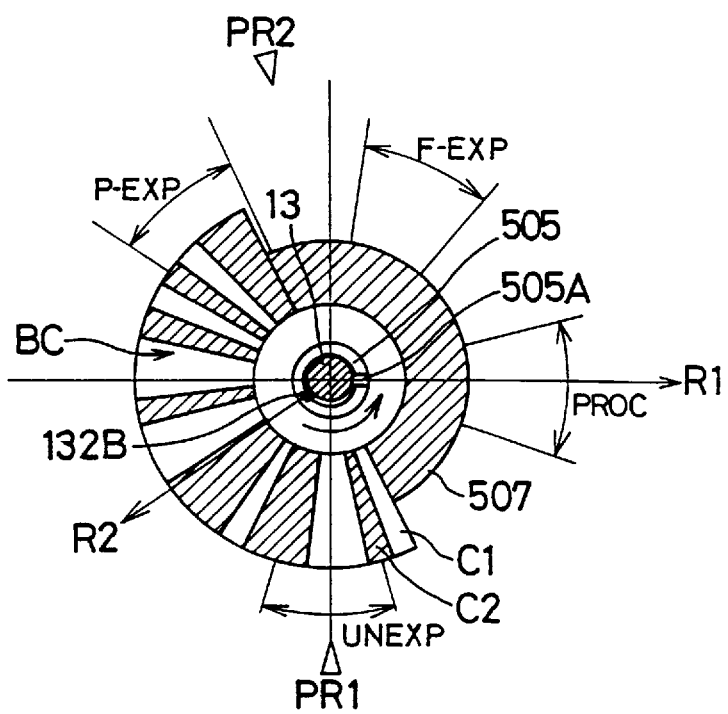
FIG. 16 is a diagram showing the position of the fork with respect to the bar code disk when the film cartridge containing an unexposed film is loaded in the cartridge chamber with the fork set in the position of a partly exposed film.

Specifically, in the case of FIG. 13, the state of a film contained in a cartridge 500 ejected from the cartridge chamber 12 last time is unexposed just as a film contained in a cartridge 500 loaded this time. Accordingly, the direction R1 of the key groove 505A of the spool hole 505 coincides with a direction R2 of the key 132B of the fork 13 when the cartridge 500 is loaded into the cartridge chamber 12. Thus, upon the loading of the cartridge 500, the key 132B is engaged with the key groove 505A, with the result that the bar code disk 507 starts rotating simultaneously with the start of the rotation of the fork 13. However, in the case that the state of a film in a cartridge 500 ejected from the cartridge chamber 12 last time differs from the state of a film in a cartridge 500 loaded into the cartridge chamber 12 this time, the direction R1 of the key groove 505A is at variance with the direction R2 of the key 132B when the cartridge 500 is loaded as shown in FIG. 16. Accordingly, the bar code disk 507 does not start rotating even if the fork 13 starts rotating.

FIG. 16 is a diagram showing a positional relationship of the fork 13 and the bar code disk 507 in the case that the film in the cartridge 500 ejected from the cartridge chamber 12 last time is a partly exposed film, whereas the film in the cartridge 500 loaded into the cartridge chamber 12 this time is an unexposed film.

As shown in FIG. 16, the direction R1 of the key groove 505A of the spool hole 505 does not coincide with the direction R2 of the key 132B of the fork 13. If the fork 13 is rotated counterclockwise in this state, the fork 13 is not completely fitted into the spool hole 505, but is only pressed against the opening of the spool hole 505 by the spring force of the coil spring 133. Accordingly, the fork 13 slides at the opening of the spool hole 505 until the direction R2 of the key 132B comes into agreement with the direction R1 of the key groove 505A.

Figure 17:
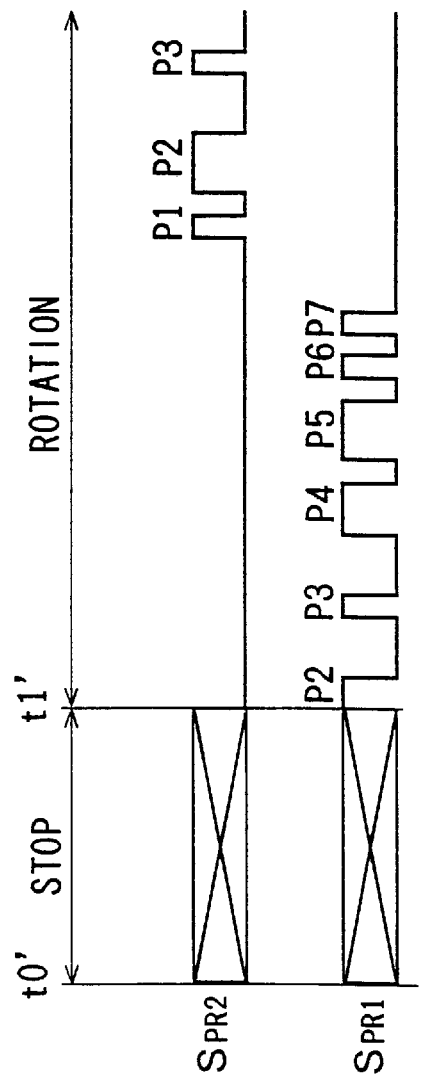
FIG. 17 is a chart showing the detection signals $S_{PR1}$, $S_{PR2}$ of the photoreflectors PR1, PR2 when the bar code disk is rotated in the case that the initial position of the fork and the initial position of the bar code disk differ.

FIG. 17 is a waveform chart of the detection signals $S_{PR1}$, $S_{PR2}$ in the above case. FIG. 17 differs from FIG. 15 in that there is a fork sliding period (t0' to t1') before the start of the rotation of the bar code disk 507. "×" in the detection signals $S_{PR1}$, $S_{PR2}$ during the fork sliding period (t0' to t1') in FIG. 17 indicates the generation of noise in the detection signals $S_{PR1}$, $S_{PR2}$ due to vibrations coming from the sliding movement of the fork 13 at the opening of the spool hole 505 and the fitting of the fork 13 into the spool hole 505. These noises are represented by sudden changes in the level of the detection signals $S_{PR1}$, $S_{PR2}$. Accordingly, the noises may erroneously be detected as a detection signal of the bar code BC in the aforementioned processing.

In view of the above, in this embodiment, the detection signals $S_{PR1}$, $S_{PR2}$ after the bar code disk 507 is rotated by one turn are used in order to perform the film information reading control based on the noise-free detection signals $S_{PR1}$, $S_{PR2}$ when the bar code disk 507 is securely rotating. In order to accelerate the processing, the bar code disk 507 is rotated only by one turn in this embodiment. However, the above reading control may be performed using the detection signals $S_{PR1}$, $S_{PR2}$ after the bar code disk 507 is rotated by two or more turns.

Further, in this embodiment, two photoreflectors are provided to scan the bar code BC, and judgments as to whether the cartridge 500 is loaded, whether an abnormality has occurred in scanning the bar code BC and whether the film in the cartridge 500 is an unexposed film are made based on the detection signals of the two photoreflectors. Accordingly, the film information may be read using the detection signal $S_{PR1}$ of the photoreflector PR1 after the first level change in the detection signal $S_{PR2}$ of the photoreflector PR2 and before the bar code 507 is rotated by one turn. Since there is a phase difference of about π between the detection signals $S_{PR1}$, $S_{PR2}$, even if the noise occurs in the detection signal $S_{PR2}$ to cause the first level change, the detection signal $S_{PR1}$ is considered to be influenced by this noise with little likelihood. With the above arrangement, the reading control for the film information can be further accelerated.

Referring back to FIG. 11, when the 13-bit data is obtained by scanning the bar code BC, it is judged whether there is any abnormality in the data represented by the 10-bit signal in the area AR2 (Step #19). The data is judged to be abnormal when the arrangement of bits has an impossible pattern. If there is a data abnormality (YES in Step #19), the count value m is decremented by "1" (Step #24). It is then judged whether the count value m is equal to "0" (Step #25). If m>0 (NO in Step #25), this routine returns to Step #17 to scan the bar code BC by rotating the bar code disk 507 again.

On the other hand, in the absence of an abnormality in the 10-bit data in the area AR2 (NO in Step #19), pieces of information including the ISO sensitivity are decoded from this 10-bit data (Step #20). It is then judged whether there is any abnormality in the data represented by the 3-bit data in the area AR1 (Step #21). The data is judged to be abnormal when the arrangement of bits has an impossible pattern.

If there is an abnormality in the 3-bit data (YES in Step #21), Step #24 follows. If there is no abnormality in the 3-bit data (NO in Step #21), the information concerning the number of exposures is decoded from this 3-bit data (Step #22), thereby completing the proper reading of the bar code BC. Thereafter, the film loading is proceeded.

On the other hand, if the data abnormality is detected in at least either one of the 3-bit data and the 10-bit data even if the reading control for the film information has been repeated three times (YES in Step #25), it is judged that there was an error in reading the film information. Then, the bar code disk 507 is set to the position when it was loaded (initial position) (Step #26), completing the film loading.

In the above routine, in the case that the data abnormality is detected, the reading control for the film information is repeated three times. This is done in consideration of an error in reading the data. The conformation as to the presence of the data abnormality is made twice in order to make the abnormality detection more certain. The conformation may be made only once (i.e. m=2) in order to accelerate the processing.

As described above, in the film photographing information reading device in which the bar code disk on one surface of which pieces of film information are recorded in the form of a bar code is integrally rotatably provided on the spool, the code detecting means is moved in a circumferential direction with respect to the bar code disk to detect the signal corresponding to the bar code; the first level change in the detection signal is detected when the pieces of film information are read in accordance with this detection signal; and the pieces of film information are read in accordance with the detection signal after the bar code disk is rotated by at least one turn following the detection timing of the first level change. Accordingly, even in the case that a noise occurs due to a delay between the detection start timing and the rotation start timing of the bar code disk, this noise does not lead to an error detection of the film information. Accordingly, the film information can accurately and securely be read.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera loadable with a film cartridge having a rotary spool connected with a film and a bar code disk rotatable with the rotary spool and provided with a bar code for indicating photographing information of the film, the camera comprising:

a fork engageable with the rotary spool when the film cartridge is loaded;

a motor which rotates the fork to rotate the rotary spool;

a reader which reads the bar code on the bar code disk to produce a read signal;

a code data generator which generates code data based on a read signal;

a decoder which decodes generated code data into photographing information of the film; and a controller which controls the code data generator to generate code data based on a read signal produced by the reader after the bar code disk rotates together with the rotary spool a predetermined rotation amount.

2. A camera according to claim 1, wherein the predetermined rotation amount is one turn.

3. A camera according to claim 1, wherein the photographing information includes the number of frames of the loaded film and the ISO sensitivity of the loaded film.

4. A camera according to claim 1, wherein the code data generator includes:

a pulse generator which generates a pulse train signal in accordance with rotation of the motor;

a converter which converts a read signal into bar code data in reference to the pulse train signal.

5. A camera loadable with a film cartridge having a rotary spool connected with a film and a bar code disk rotatable with the rotary spool and provided with a bar code for indicating an exposure state of the film, the camera comprising:

a fork engageable with the rotary spool when the film cartridge is loaded;

a motor which rotates the fork to rotate the rotary spool;

a first reader which reads the bar code on the bar code disk to produce a first read signal;

a second reader which reads the bar code on the bar code disk to produce a second read signal, the second reader being provided at such a different position from the first reader that the first read signal has at least a first predetermined number of changes before the second read signal has an initial change when a loaded film is in an unexposed state, and the first read signal has a second predetermined number of changes before the second read signal has an initial change when a loaded film is in a state other than an unexposed state;

a counter which counts a number of changes in the first read signal before the second read signal has an initial change;

a comparator which compares the number counted by the counter with a predetermined reference value, the predetermined reference value being greater than an intermediate value between the first and second predetermined numbers; and a judger which judges an exposure state of the film based on a result of the comparator.

6. A camera according to claim 5, wherein the first predetermined number is ten, the second predetermined number is two, and the predetermined reference value is nine.

7. A method for loading a camera with a film cartridge having a rotary spool connected with a film and a bar code disk rotatable with the rotary spool and provided with a bar code for indicating film information, the method comprising steps of:

engaging the rotary spool of the film cartridge with a fork provided on the camera;

rotating the fork to rotate the rotary spool; and reading the bar code on the bar code disk by first and second readers to judge, based on read signals of the first and second readers, whether the film has been exposed, wherein the first and second readers are provided at such different positions that the first read signal has at least a first predetermined number of changes before the second read signal has an initial change when a loaded film is in an unexposed state, and the first read signal has a second predetermined number of changes before the second read signal has an initial change when a loaded film is in a state other than an unexposed state, the judgment as to whether the film has been exposed is made by;

counting changes in the first read signal before the second read signal has an initial change; and comparing a counted change number with a predetermined reference value the predetermined reference value being greater than an intermediate value between the first and second predetermined numbers.

8. A method according to claim 7, wherein the first predetermined number is ten, the second predetermined number is two, and the predetermined reference value is nine.

9. A method for loading a camera with a film cartridge having a rotary spool connected with a film and a bar code disk rotatable with the rotary spool and provided with a bar code for indicating film information, the method comprising steps of:

engaging the rotary spool of the film cartridge with a fork provided on the camera;

rotating the fork to rotate the rotary spool;

reading the bar code on the bar code disk by first and second readers to judge based on read signals of the first and second readers whether the film has been exposed; and detecting whether the bar code disk rotates together with the rotary spool a predetermined rotation amount after the film is judged to have not been exposed;

generating code data based on a read signal produced by one or both of the first and second readers after the bar code disk is detected to rotate the predetermined rotation amount; and decoding generated code data into film information.

10. A method according to claim 9, wherein the predetermined rotation amount is one turn.

* * * * *